UNITED STATES PATENT OFFICE.

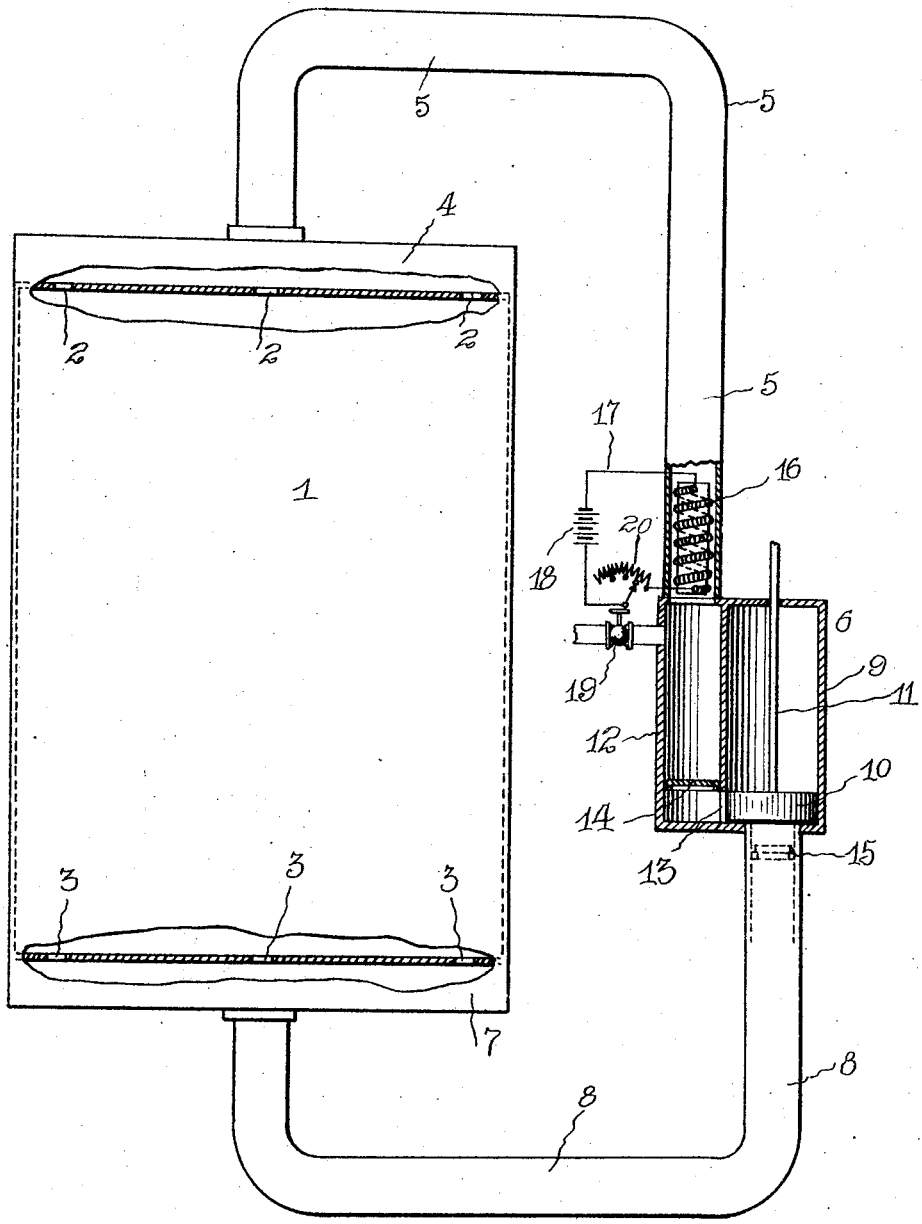

HJALMAR V. BARCLAY, OF NEW YORK, N. Y.

HEAT EXCHANGER.

1,416,320. Specification of Letters Patent. Patented May 16, 1922.

Application filed February 14, 1919. Serial No. 276,959.

*To all whom it may concern:*

Be it known that I, HJALMAR V. BARCLAY, a citizen of the United States, residing at borough of Manhattan, city, county, and State of New York, have invented a new and useful Improvement in Heat Exchangers, of which the following is a specification.

This invention relates to temperature changing means for various purposes, and the present improvement, which constitutes a modification of the device comprised in my application for patent, Serial No. 236,022, filed May 22nd 1918, is directed particularly to the employment of a hollow member which is caused to effect temperature changes in its vicinity through the association therewith of means for passing a continuous flow of heated air therethrough.

The character of the temperature changing member, as to its shape, size and the material of which it is composed, may be such as to suit the particular service required thereof, and needs defining only to the extent that it must render said member capable of receiving and exhausting a flow of air, which is passed therethrough in manner to maintain a desired degree of temperature for said member.

Fundamentally, therefore, my invention consists of a hollow member with means for passing heated air therethrough so that said hollow member may constitute a temperature changer.

Associated with said member, by a suitable duct or piping is an air pump or blower to cause a flow of air to be passed through the hollow member, and suitable means for changing the temperature of the air thus employed are also provided.

To economize the temperature changing means I may employ a closed circulating system for passing and repassing the same quota of air through the hollow member, using a combined pressure-suction pump or blower for this purpose, and providing a fresh air inlet to supply any losses that may occur through leakage.

Other features and advantages of my said invention will hereinafter appear.

In the drawing I have shown a layout of my invention in more or less diagrammatic manner. In said drawing let 1 indicate a hollow member, here shown as of flat, oblong form with inlet orifices 2 in one end and outlet orifices 3 in the opposite end. The inlet orifices 2 open into a header or manifold 4, which communicates as by a pipe 5 with the pressure portion of an air pump 6, and the outlet orifices 3 open into a header or manifold 7, which communicates, as by a pipe 8, with the suction portion of said pump.

The orifices 2 and 3 are dispersed over their respective ends of the hollow member to cause the air flow to be distributed through the interior area of said member, to uniformly influence the latter.

The air pump 6 is here represented as comprising a cylinder 9, having a plunger 10, with plunger rod 11, which connects with any desirable operating organism, (not shown). A chest or box 12, which may be cylindrical, is arranged alongside cylinder 9, and is in communication therewith as through a port 13, said chest 12 having a check-valve 14 which opens under the pressure of the plunger instroke to admit a charge of air into said chest and thence through the pipe 5, which latter connects with the opposite end of the chest, to thus supply a volume of air to the hollow member. The outstroke of plunger 10 operates by suction to draw a charge of air, through pipe 8, with which the cylinder head connects, from the outlet-header of the hollow member, thus relieving pressure in said member and establishing the circulatory system of air flow; the suction indraft of air to the pump passing through a check-valve 15, which opens for the purpose. By these means the same volume of air is passed and repassed through the member 1, obviating the need that would otherwise exist for changing the temperature of fresh indraughts of air.

The air heating means here indicated comprises a resistance coil 16, located in the pipe 5, said coil being included in an electrical circuit 17, having a source of electrical energy, as 18. Thus the air leaving the chest 12 flows past coil 16 in contact therewith to raise its temperature. Only a moderate amperage is necessary to satisfy the heat losses through radiation, because the heated air is not exhausted from the system, but is continually circulated therethrough.

In case of losses from the system, which may occur through leakage or otherwise, fresh air may be admitted to the system, to supply any deficiency, as through a valve, as 19, indicated as applied to the chest 12.

As one example of means for varying the temperature of the heated air passed through the system, I may employ a rheostat, as 20, in the circuit 17.

Variations may be resorted to within the spirit and scope of my said invention, and parts used without others.

I claim:

1. In a hot appliance, in combination, a hollow pad, having an inlet and an outlet, a pump, an electric heater, means for conveying air continuously from said pump and heater to said inlet, through said hollow pad, and to said outlet, and means for admitting regulated quantities of cool air to said inlet.

2. In a hot appliance, in combination, a hollow pad, having an inlet and an outlet, a pump, tubing connecting said pump with said inlet and outlet, and a resistance coil located in said tubing, whereby air delivered to said inlet by said pump is heated in its passage to said inlet.

3. In a hot appliance, in combination, a hollow pad, having an inlet and an outlet, a combined pump and air heater, and circulatory means for conveying heated air from said pump, to said pad, and back to said pump.

In testimony whereof, I have signed my name to this specification in the presence of two subscribing witnesses, this eighth day of February 1919.

HJALMAR V. BARCLAY.

Witnesses:
P. F. COOLEY,
ROGER DONOHUE.